(12) United States Patent
de Callafon et al.

(10) Patent No.: US 10,452,032 B1
(45) Date of Patent: Oct. 22, 2019

(54) OPTIMIZING POWER CONTRIBUTION OF DISTRIBUTED ENERGY RESOURCES FOR REAL TIME POWER DEMAND SCHEDULING

(71) Applicant: PXiSE Energy Solutions, LLC, San Diego, CA (US)

(72) Inventors: Raymond A. de Callafon, San Diego, CA (US); Sai Akhil Reddy Konakalla, La Jolla, CA (US); Charles H. Wells, San Diego, CA (US); Patrick T. Lee, San Diego, CA (US)

(73) Assignee: PXiSE Energy Solutions, LLC, San Diego, CA (US)

( * ) Notice: Subject to any disclaimer, the term of this patent is extended or adjusted under 35 U.S.C. 154(b) by 106 days.

(21) Appl. No.: 15/696,075

(22) Filed: Sep. 5, 2017

Related U.S. Application Data

(60) Provisional application No. 62/385,179, filed on Sep. 8, 2016.

(51) Int. Cl.
*G06F 19/00* (2018.01)
*G05B 13/02* (2006.01)
(Continued)

(52) U.S. Cl.
CPC ............ *G05B 13/021* (2013.01); *H02J 3/381* (2013.01); *H02J 13/00* (2013.01); *H02J 3/383* (2013.01); *H02J 3/386* (2013.01)

(58) Field of Classification Search
CPC ........ G05B 13/021; H02J 3/381; H02J 13/00; H02J 3/383; H02J 3/386
See application file for complete search history.

(56) References Cited

U.S. PATENT DOCUMENTS 6,819,087 B2  11/2004  Delmerico et al.
6,985,800 B2   1/2006  Rehtanz et al.
(Continued)

FOREIGN PATENT DOCUMENTS

CN  102185326 A   9/2011
CN  102707628 A  10/2012
(Continued)

OTHER PUBLICATIONS

Patent Cooperation Treaty, International Search Report for PCT/US2017/034765, dated Oct. 9, 2017.
(Continued)

*Primary Examiner* — Michael D Masinick
(74) *Attorney, Agent, or Firm* — Jones Day

(57) ABSTRACT

Systems and methods are described herein for controlling power at a point of interconnection of the power grid. Power data that characterizes power flow at a point of interconnection of the power grid is received. The power data includes power contribution levels of at least one distributed energy resource and at least one analysis profile for a time period. An objective energy function is determined based on the power contribution levels and the at least one analysis profile. A power contribution set-point is determined based on a minimum value of the objective energy function. The power contribution set-point reflects an optimized power contribution level of the at least one distributed energy resource. The power contribution set-point is provided to the at least one distributed energy resource to achieve the optimized power contribution level by modifying the power contribution of the at least one distributed energy resource.

21 Claims, 10 Drawing Sheets

(51) Int. Cl.
*H02J 13/00* (2006.01)
*H02J 3/38* (2006.01)

(56) References Cited

U.S. PATENT DOCUMENTS

| | | | |
|---|---|---|---|
| 7,096,175 | B2 | 8/2006 | Rehtanz et al. |
| 7,274,975 | B2 | 9/2007 | Miller |
| 7,490,013 | B2 | 2/2009 | Wells |
| 7,498,821 | B2 | 3/2009 | Wells |
| 7,710,729 | B2 | 5/2010 | Li et al. |
| 7,755,371 | B2 | 7/2010 | Wells |
| 7,961,112 | B2 | 6/2011 | Wells |
| 7,987,059 | B2 | 7/2011 | Gong et al. |
| 8,022,575 | B2 | 9/2011 | Korba et al. |
| 8,457,912 | B1 | 6/2013 | Wells |
| 8,498,752 | B2 | 7/2013 | Wells |
| 8,532,230 | B2 | 9/2013 | Taft |
| 8,659,186 | B2 | 2/2014 | Teichmann et al. |
| 8,738,191 | B2 | 5/2014 | Aivaliotis et al. |
| 8,892,375 | B2 | 11/2014 | Taft |
| 8,907,615 | B2 | 12/2014 | Mills-Price et al. |
| 8,942,856 | B2 | 1/2015 | Ren et al. |
| 9,037,425 | B2 | 5/2015 | Yang et al. |
| 9,043,037 | B2 | 5/2015 | Bhageria et al. |
| 9,166,500 | B2 | 10/2015 | Wu et al. |
| 9,230,429 | B2 | 1/2016 | McKinley et al. |
| 9,411,389 | B2 | 8/2016 | Shi et al. |
| 9,444,257 | B2 | 9/2016 | Wells |
| 9,496,715 | B2 | 11/2016 | Wilson |
| 9,507,367 | B2 | 11/2016 | Venayagamoorthy et al. |
| 9,588,156 | B2 | 3/2017 | Glavic et al. |
| 9,634,850 | B2 | 4/2017 | Taft et al. |
| 9,638,831 | B1 * | 5/2017 | Hoff .................. G01W 1/10 |
| 2008/0071482 | A1 | 3/2008 | Zweigle et al. |
| 2009/0319090 | A1 | 12/2009 | Dillon et al. |
| 2011/0276194 | A1 | 11/2011 | Emalfarb et al. |
| 2012/0280673 | A1 * | 11/2012 | Watanabe .......... H02J 3/1885 323/304 |
| 2013/0043690 | A1 | 2/2013 | Wilson et al. |
| 2013/0073108 | A1 | 3/2013 | Kolwalkar |
| 2013/0073109 | A1 | 3/2013 | Cheng et al. |
| 2013/0218494 | A1 | 8/2013 | Chiang et al. |
| 2013/0262012 | A1 | 10/2013 | O'Sullivan et al. |
| 2014/0070617 | A1 | 3/2014 | Detmers et al. |
| 2014/0074306 | A1 | 3/2014 | Lu et al. |
| 2014/0074311 | A1 | 3/2014 | Kearns et al. |
| 2014/0159658 | A1 | 6/2014 | Kiceniuk et al. |
| 2014/0172503 | A1 * | 6/2014 | Hammerstrom ... G06Q 30/0206 705/7.31 |
| 2014/0244065 | A1 | 8/2014 | Biswas et al. |
| 2014/0277599 | A1 | 9/2014 | Pande et al. |
| 2014/0306534 | A1 | 10/2014 | Shi et al. |
| 2015/0005967 | A1 | 1/2015 | Jöhannsson et al. |
| 2015/0006141 | A1 | 1/2015 | Enenkel et al. |
| 2015/0051852 | A1 | 2/2015 | Pan et al. |
| 2015/0051856 | A1 | 2/2015 | Chu et al. |
| 2015/0073735 | A1 | 3/2015 | Abido et al. |
| 2015/0100282 | A1 | 4/2015 | Shokooh et al. |
| 2015/0326160 | A1 | 11/2015 | Diez-Maroto et al. |
| 2016/0003879 | A1 | 1/2016 | Wilson et al. |
| 2016/0091537 | A1 | 3/2016 | Gaarder et al. |
| 2016/0118878 | A1 | 4/2016 | Alteneiji |
| 2016/0179120 | A1 | 6/2016 | Boardman et al. |
| 2016/0198245 | A1 | 7/2016 | Rhoads et al. |
| 2016/0211664 | A1 * | 7/2016 | Subbotin .................. H02J 3/32 |
| 2016/0241035 | A1 | 8/2016 | Shi et al. |
| 2016/0266559 | A1 | 9/2016 | Shi et al. |
| 2016/0299187 | A1 | 10/2016 | Liang et al. |
| 2016/0313197 | A1 | 10/2016 | Acharya et al. |
| 2016/0320435 | A1 | 11/2016 | Budhraja et al. |
| 2016/0329700 | A1 | 11/2016 | O'Brien et al. |
| 2016/0329709 | A1 | 11/2016 | Park et al. |
| 2016/0334447 | A1 | 11/2016 | Parashar et al. |
| 2016/0344234 | A1 * | 11/2016 | Hund ................. G06Q 10/0631 |
| 2017/0012468 | A1 | 1/2017 | Park |
| 2017/0017298 | A1 | 1/2017 | Biswas et al. |
| 2017/0104366 | A1 | 4/2017 | Münz |
| 2017/0109524 | A1 | 4/2017 | Kolacinski et al. |
| 2017/0194814 | A1 * | 7/2017 | Chakraborty .......... G06Q 10/06 |
| 2017/0285111 | A1 * | 10/2017 | Fife ..................... G05B 13/021 |
| 2017/0346286 | A1 | 11/2017 | Wells et al. |
| 2017/0346291 | A1 | 11/2017 | Wells et al. |
| 2018/0224814 | A1 * | 8/2018 | Elbsat ................. G05B 13/021 |
| 2018/0294649 | A1 * | 10/2018 | Bright .................... H02J 3/381 |
| 2018/0356770 | A1 * | 12/2018 | ElBsat ................. G05B 13/021 |
| 2018/0356782 | A1 * | 12/2018 | ElBsat ................. G05B 19/042 |

FOREIGN PATENT DOCUMENTS

| | | | |
|---|---|---|---|
| CN | 203166515 U | | 8/2013 |
| CN | 103414245 A | | 11/2013 |
| CN | 103474992 A | | 12/2013 |
| CN | 103632313 A | | 3/2014 |
| CN | 104242462 A | | 12/2014 |
| CN | 104297632 A | | 1/2015 |
| CN | 104865474 A | | 8/2015 |
| CN | 105224811 A | | 1/2016 |
| CN | 105375484 A | | 3/2016 |
| CN | 105529704 A | | 4/2016 |
| CN | 106383287 A | | 2/2017 |
| CN | 106443246 A | | 2/2017 |
| EP | 1 830 447 A1 | | 9/2007 |
| EP | 1 919 076 A2 | | 5/2008 |
| EP | 2 182 207 A2 | | 5/2010 |
| KR | 20160038927 A | | 4/2016 |
| WO | 2011150247 A1 | | 12/2011 |
| WO | 2014061889 A1 | | 4/2014 |
| WO | 2017/210124 A1 | | 12/2017 |

OTHER PUBLICATIONS

Patent Cooperation Treaty, Written Opinion of the International Searching Authority for PCT/US2017/034765, dated Oct. 9, 2017.

* cited by examiner

OPTIMIZING POWER CONTRIBUTION OF DISTRIBUTED ENERGY RESOURCES FOR REAL TIME POWER DEMAND SCHEDULING

CROSS REFERENCE TO RELATED APPLICATION

This application claims priority to U.S. Application No. 62/385,179, titled "Maximizing Utilization of Distributed Energy Resources Including Energy Storage for Real Time Demand Scheduling," filed Sep. 8, 2016, the contents of which is incorporated herein by reference in its entirety.

TECHNICAL FIELD

The subject matter described herein relates to electrical power grids including microgrids and, more specifically, to optimizing power contribution levels of distributed energy resources within such electrical power grids.

BACKGROUND

Electric power systems generate and distribute electricity to a number of energy consumers or loads. Power generation can result from the conversion of non-renewable and/or renewable resources into electrical energy. Such energy can be distributed to energy consumers and/or loads for consumption based on varying demand levels. The distribution of electrical energy throughout the power system can involve control systems which can provide control and/or monitor the power flow in order to achieve the varying demand levels.

SUMMARY

In one aspect, power data that characterizes power flow at a point of interconnection of the power grid is received. The power data includes power contribution levels of at least one distributed energy resource and at least one analysis profile for a time period. The power contribution levels can include generation or consumption of one or multiple phase real and/or reactive power flow. The at least one distributed energy resource can include at least one of: a photovoltaic cell, a battery, a fuel cell, a wind turbine, a combined cycle gas turbine, a sterling engine, an energy storage system, or a generator. The time period can include twenty-four hours, thirty-days, a pre-determined billing cycle, or a variable planning period. In some variations, the at least one analysis profile can include at least one of: historical net-load data of the power grid, forecasted weather data, or forecasted energy resource data. In other variations, the at least one analysis profile can include a net power demand profile of the at least one distributed resource and the objective energy function comprises a combinatorial constrained least squares function of the power contribution levels. An objective energy function is determined based on the power contribution levels and the at least one analysis profile. A power contribution set-point is determined based on a minimum value of the objective energy function. The power contribution set-point reflects an optimized power contribution level of the at least one distributed energy resource. The power contribution set-point is provided to the at least one distributed energy resource to achieve the optimized power contribution level by modifying the power contribution of the at least one distributed energy resource.

In some variations the objective energy function can be a non-linear criterion summing together (i) an energy loss scaled by energy storage states of the at least one distributed energy resource and (ii) a matrix representation of states of the at least one distributed energy resource multiplied by a penalty factor of the at least one distributed energy resource. The penalty factor can account for at least one operational constraint of the at least one distributed energy resource.

In other variations, the power contribution set-point can include receiving an interval of the objective energy function. A midpoint of the interval and a corresponding power contribution value of the objective energy function at the midpoint can be iteratively determined. The interval can include at least one of: a pre-determined interval or a variable interval having a pre-defined end-time. Convergence of the power contribution value can be iteratively determined. The power contribution set-point can be the lowest power contribution value having convergence.

In some variations, the power contribution set-point can result in one or more of increasing power generation of the at least one distributed energy resource based on the power contribution set-point, decreasing power generation of the at least one distributed energy resource based on the power contribution set-point, maintaining power generation of the at least one distributed energy resource based on the power contribution set-point, increasing energy storage of the at least one distributed energy resource based on the power contribution set-point, decreasing energy storage of the at least one distributed energy resource based on the power contribution set-point, maintaining energy storage of the at least one distributed energy resource based on the power contribution set-point.

Non-transitory computer program products (i.e., physically embodied computer program products) are also described that store instructions, which when executed by one or more data processors of one or more computing systems, cause at least one data processor to perform operations described herein. Similarly, computer systems are described that may include one or more data processor sand memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides for controlling power of a power grid based on an objective energy function. Such function can be utilized to determine an optimal power contribution set-point for distributed energy resources contributing to the power grid. Modifying power generation and/or consumption of various distributed energy resources can minimize consumption levels of non-renewable resources such as oil and/or coal utilized in power generation. Additionally, such minimization can minimize emissions of harmful gases into the environment (e.g., greenhouse gases).

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Every time a light switch is turned on or a cell phone or electric vehicle is plugged into the wall to charge, power is demanded from a power grid. The light being on and cell phone charging, in this example, are "loads" which consume power from the power grid. When such loads are connected, the amount of power drawn or "demanded" from the power grid will fluctuate over time. There are times of the day when the amounts of power demanded from the grid are larger than others. For example, more power may be demanded when all the neighborhood lights are on in the evenings. This large power demand is known as a "peak demand." Other times, the power demand is minimal. Such as when a majority of the neighborhood is sleeping and no lights are on. Controlling power at a point of interconnection of the power grid based on fluctuating demand schedules helps to ensure that a light always comes on (absent a blown bulb) when one turns on a light switch.

Figure 1:
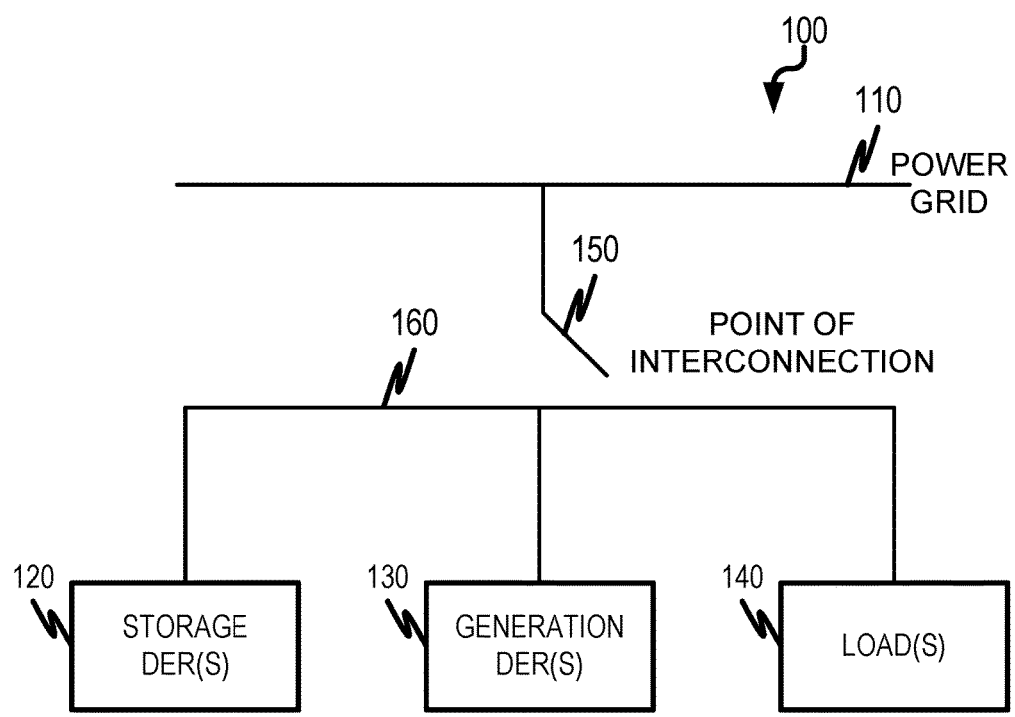
FIG. 1 is a block diagram illustrating an example power grid system architecture.

FIG. 1 is a block diagram illustrating an example power grid system architecture 100. System architecture 100 can include, for example, a power grid 110 and one or more distributed energy resources (DERs) such as storage DER(s) 120, generation DER(s) 130, and load(s) 140. The storage DER(s) 120, generation DER(s) 130, and load(s) 140 can be interconnected to one another and to power grid 110 via a point of interconnection (POI) 150. Connection lines 160 electrically couple storage DER(s) 120, generation DER(s) 130, and load(s) 140 to POI 150, but are not necessarily representative of an electrical bus connection. DERs can include renewable and/or non-renewable power resources. Example non-renewable DERs can include, but are not limited to, combined cycle gas turbines, sterling engines, diesel motors, and/or thermal energy sources that can generate power using, for example, gasoline, oil, or natural gas and other combustible material (e.g., garbage, bagasse, or other organic materials). Examples of renewable energy resources can include photovoltaic cells, fuel cells, wind turbines, sewage plant bio-fuel generators and/or hydroelectric dams. Additionally, DERs can also include batteries or other energy storage systems such as electric vehicle charging systems that have the ability to provide power flow to either store or generate electric energy. DERs can also be categorized based on its capabilities as a storage DER(s) 120, generation DER(s) 130, and/or load(s) 140.

Each DER (storage DER(s) 120, generation DER(s) 130, load(s) 140) can have an associated power contribution level to the power grid 110. A power contribution level can be an amount of power a DER consumes from the power grid 110 (e.g., storage DER(s) 120, load(s) 140) or contributes to the power grid 110 (e.g., generation DER(s) 130). Additionally, a power contribution level can also be zero indicating the DER is maintaining a dormant state on the power grid 110 by neither consuming nor generating power. The overall power level of a power grid 110 measured at the POI 150 can be dependent upon the number of DERs connected and the respective power contribution levels. Controlling the overall power level at a point of interconnection of the power grid can ensure that the power grid 110 can meet various demands throughout a given period of time. Such balance can be achieved by determining a power contribution set-point for each DER (e.g., storage DER(s) 120, generation DER(s) 130, load(s) 140) as described herein. The set point can be the desired value of the power flow at the POI and can be positive or negative.

Figure 2:
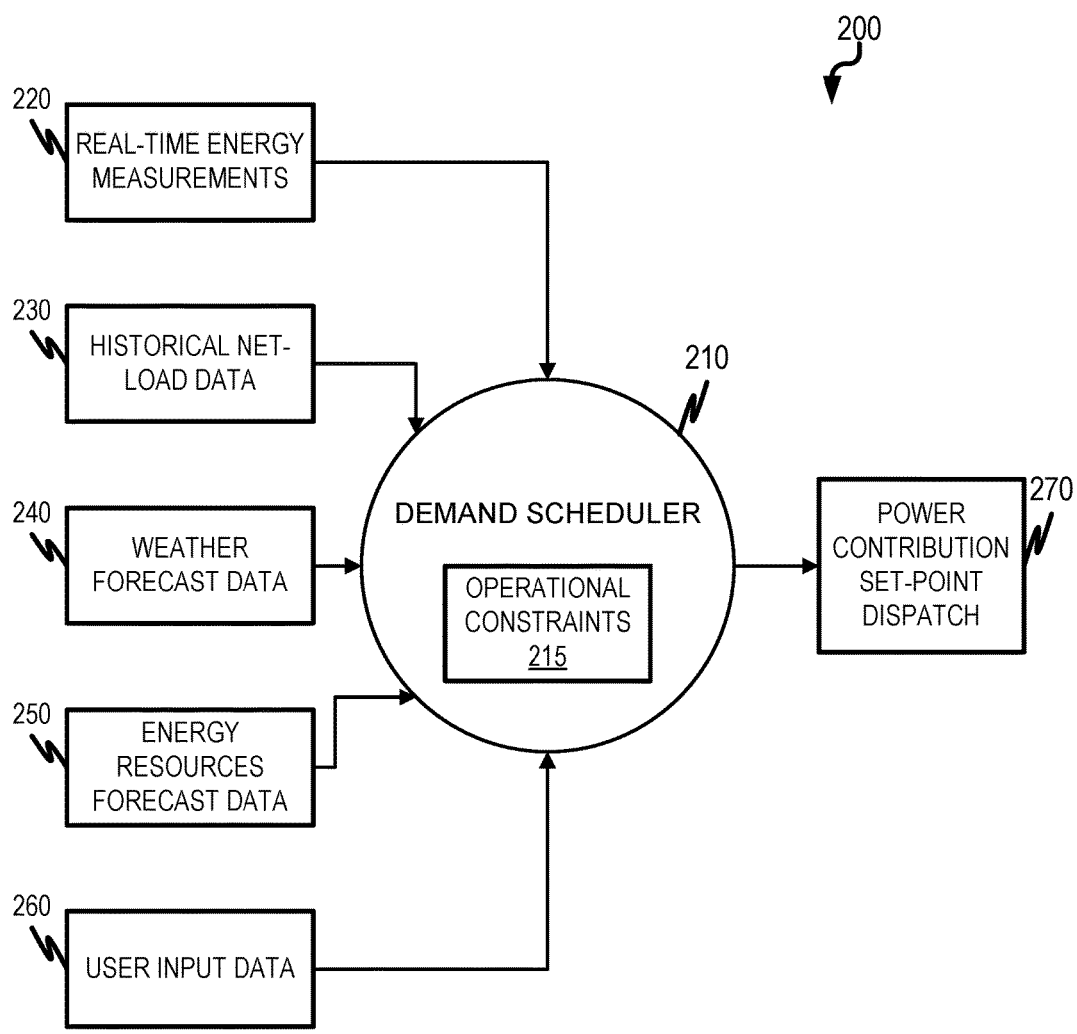
FIG. 2 is a block diagram illustrating an example power demand scheduling system architecture.

FIG. 2 is a block diagram illustrating an example power demand scheduling system architecture 200. In some variations, demand scheduler 210 can reside at POI 150 within power grid system architecture 100 or can be located at any point where computer programs can be used to compute the demand schedule. Demand scheduler 210 can be used to determine power contribution set-points of one or more DERs (e.g., storage DER(s) 120, generation DER(s) 130, load(s) 140) based on power data (e.g., generated or consumed at POI 150). The power data can include real-time power contribution levels of one or more DERs indicated by real-time energy measurements 220. Additionally, power data can include one or more analysis profiles such as historical net-load data 230, weather forecast data 240, energy resources forecast data 250, and/or user input data 260. Historical net-load data 230 can include data for a period of time in the past that characterizes the power levels of power grid 110 at POI 150. Historical net-load data 230 can represent the difference between the power consumed by one or more DERs and the power generated by one or more DERs. Demand scheduler 210 can utilize historical net-load data 230, which is the total load minus the generation, for example, to account for past power usage of power grid 110. Weather forecast data 240 can be utilized to determine various weather conditions (e.g., temperature, cloud coverage, inclement weather) that may impact power generation or consumption of one or more DERs (e.g., photovoltaic cells, fuel cells, wind turbines, hydroelectric dams, thermal energy generators). Energy resources forecast data 250 can include scheduled outage of individual DERs, loss of efficiency of a DER or availability of bio-fuel for a DER. Additional data can be provided by a user to demand scheduler 210 via user input data 260. User input data 260 can include, but is not limited to manual user commands, external request commands, user specified operational constraints or equipment availability.

Operational constraint data 215 for one or more DERs can be stored within demand scheduler 210. In some variations, such data can be provided by a user via user input data 260. For example, a storage DER 120 (e.g., battery) can have operational constraints 215, including but not limited to, a rate at which the battery can charge, a rate at which the battery can discharge, nominal operational storage limits of how much power the battery can store, a state of charge (SOC) which indicates a percentage of the nominal operational storage limit in use or available, the limit on the number of battery charge cycles, availability of battery modules and their state of readiness for use and/or the battery lifetime. A generation DER 130 can have operational constraints, including but not limited to, a minimum power level that can be generated as well as the minimum power that can be generated while in operation, the rate of change of power, the maximum power that can be generated, an efficiency percentage of power generation, and/or the lifetime other generation DER 130.

Using inputs and stored data, demand scheduler 210 can output a power contribution set-point via power contribution set-point dispatch 270. Power contribution set-point dispatch 270 can provide a power contribution set-point to each of the one or more DERs. For each DER, the power contribution set-point can, for example, increase or decrease power generation levels of the DER, increase or decrease power consumption levels of the DER, maintain the power generation or consumption levels, or cease any power generation or consumption (e.g., temporarily exclude the DER from the power grid). In other words, each DER, k, can have a power contribution level, $P_k(t)$, at a time, t, satisfying the expression:

$$\Sigma_{k \in \Omega} P_k(t) = P(t) \quad (1)$$

where Ω denotes a set of integers and P(t) represents the net power at POI 150. The power contribution level, $P_k(t)$ of each DER, can be positive (e.g., DER is generating power to power grid 110) or negative (e.g., DER is consuming power from power grid 110). While the net power, P(t), can represent the net power at POI 150 for all possible DERs, with the number of DERs denoted by N, the power contribution set-point of each DER can modify the total number of DERs generating power to or consuming power from power grid 110 such that a smaller subset of DERs (e.g., k∈Ω) operate on power grid 110. In some variations, the subject matter described herein results in a smallest possible subset of DERs that satisfy Equation (1).

Based on the power contribution set-point dispatch 270, each DER can be commanded to achieve an optimized power contribution level. In order to determine the power contribution set-point, demand scheduler 210 can determine an objective energy function characterizing the capabilities of the power grid 110 given the various operational constraints and/or analysis profiles. Based on the operational constraints and/or the analysis profiles, the objective energy function can be a non-linear function.

Using a non-linear function such as but not limited to quadratic criterion, the objective energy function, J, can be represented by:

$$J = f'x + \tfrac{1}{2} * PF * x'Hx \quad (2)$$

where f' is a linear energy function, x is a matrix representation of storage states of a storage DER 120, x' represents the matrix transpose of x, PF is a penalty factor representing one or more operational constraints of a DER, and H is a Hessian matrix accounting for the sum of distances between two states of a storage DER 120 according to its respective SOC level. The linear energy function, f', can be represented by:

$$f' = \sum_{i=1}^{n} d(i) * p(i) \quad (3)$$

where i is an interval, d(i) is the power demand level of the POI at interval i, and p(i) is the price per kWh at interval i, and n is the number of intervals in a time period (e.g., fifteen minutes, twenty-four hours, thirty-days, a pre-determined billing cycle, a variable planning period). The power demand level at the POI at interval i can be represented by:

$$d(i) = 1(i) - g(i) \quad (4)$$

where l(i) is the load at the $i^{th}$ interval and g(i) is a forecasted generation at the $i^{th}$ interval. The forecasted generation can come from the weather forecast that for example could include the expected solar generation for the next 24 hours. The Hessian matrix operations of Equation (1) can be represented by:

$$x'Hx = \sum_{i=1}^{n} (x(i) - x(i-1))^2 \quad (5)$$

where x(i) is the current storage in kWh at interval i and x(i−1) is the value of the state in one previous interval. For example, if interval i is a fifteen-minute interval for a twenty-four hour time period, the number of intervals in the time period, n, equals 96.

The operational constraints of each DER can be represented mathematically. For example, the nominal operational storage limits can be represented by:

$$C_{i\ min} \leq C_i \leq C_{i\ max} \quad (6)$$

where $C_{i\ min}$ is the minimum energy storage capacity in kWh of the DER, $C_i$ is the current value of the capacity in kWh of the DER, and $C_{i\ max}$ is the maximum capacity of the DER. Charging operational constraints can be represented by:

$$-P_d \leq P_i \leq P_c, \quad (7)$$

$$P'_d = P_d/\eta, \text{ and} \quad (8)$$

$$P'_c = \eta * P_c^* \quad (9)$$

where $P_d$ is the maximum discharge rate in kWh of the DER, $P_c$ is the maximum charge rate in kWh of the DER, $P_i$ is the current charge/discharge rate of the DER in kWh, $P'_d$ is the actual maximum discharge rate of the DER in kWh accounting for round trip efficiency (e.g., percentage of residual power after energy loss associated in delivering power from the DER), $P'_c$ is the actual maximum charge rate of the DER in kWh accounting for round trip efficiency, and $\eta^2$ is the round trip efficiency of the DER. Power constraints of power grid 110 can be represented by:

$$D_{max\ i} < D_{T\ max} \quad (10)$$

where $D_{max\ i}$ is the power demand in kW at interval i and $D_{T\ max}$ is the desired peak shaved demand in kW.

Consider the calculation of the optimal charge state of battery systems in a microgrid. The charge state constraint of the DER can be represented by:

$$x_1 = x_n. \tag{11}$$

to indicate that the state of charge at the end of the optimization time period must be equal to the state of charge at the beginning of the subsequent optimization time period. In some variations, demand scheduler 210 can obtain a maximum power demand for a time period from historical net-load data 230. Various time of use pricing rates (e.g., hourly rates, seasonal rates) can be provided to demand scheduler 210 via user input data 260. Additionally, user input data 260 can provide initial operational constraints 215 to demand scheduler 210. Demand scheduler 210 can then compute the objective energy function using Equation (1). The power contribution set-point can be found by determining a minimum value of the objective energy function. The minimum value can be found using an iterative bisection algorithm. The interval for analysis can be provided via user input data 260. For each interval, a midpoint is determined along with a corresponding power contribution at that value. The power contribution value at the midpoint is stored for comparison with the next interval midpoint value. Such evaluation iterates until the power contribution level reaches a minimum value having convergence to zero.

Figure 3:
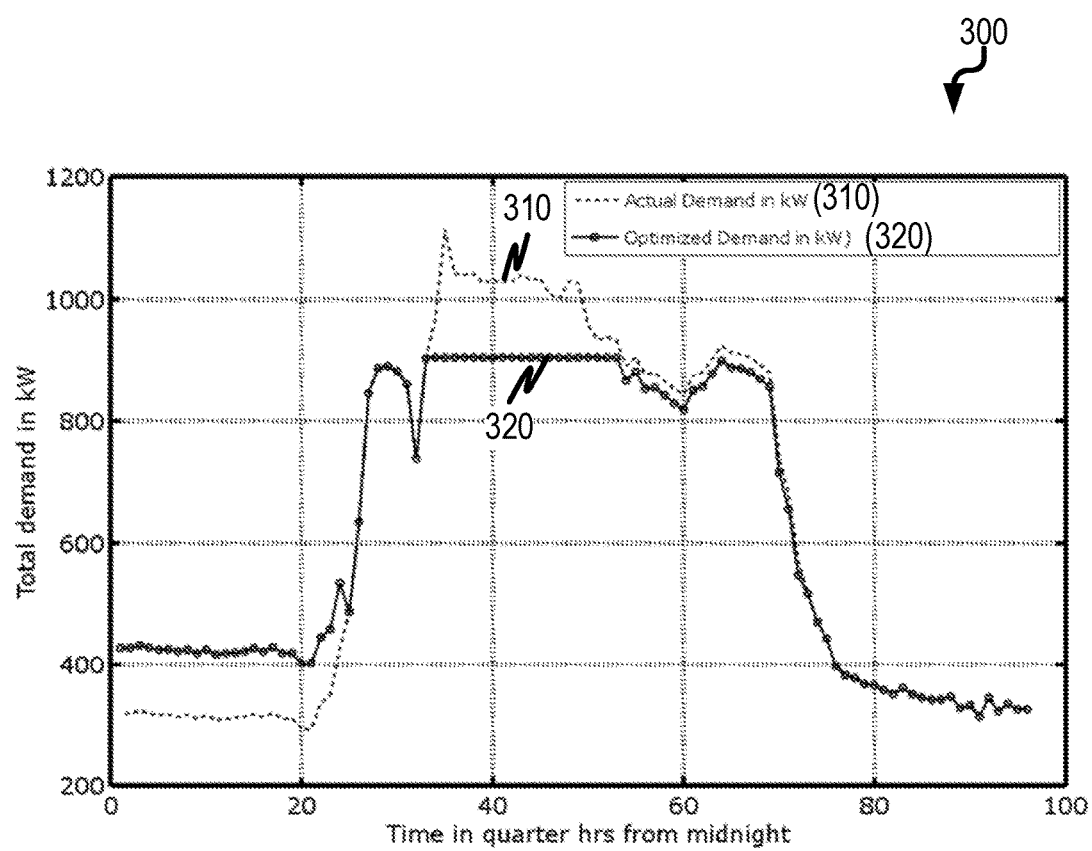
FIG. 3 is a plot illustrating example power demand curves of an actual power demand profile and an optimized demand profile.

FIG. 3 is a plot 300 illustrating example power demand curves of an actual power demand profile 310 and an optimized demand profile 320 using an interval of fifteen minutes over a twenty-four hour time period. As illustrated in FIG. 3, the optimized demand profile 320 decreases the actual demand profile 310 by approximately 200 kW at the 35$^{th}$ interval of the scheduling period. In this example, the DER is a battery (e.g., storage DER 120). The optimization profile starts at 12:00 AM and goes for a twenty-four hour time period. As illustrated in FIG. 3, power is consumed by the battery from the power grid 110 during "off-peak hours" (e.g., between 0-20 time in quarter hrs from 12 am) and then supplied back to the power grid 100 during "on-peak hours" (e.g., between 30-55 time in quarter hrs from 10 pm).

Figure 4:
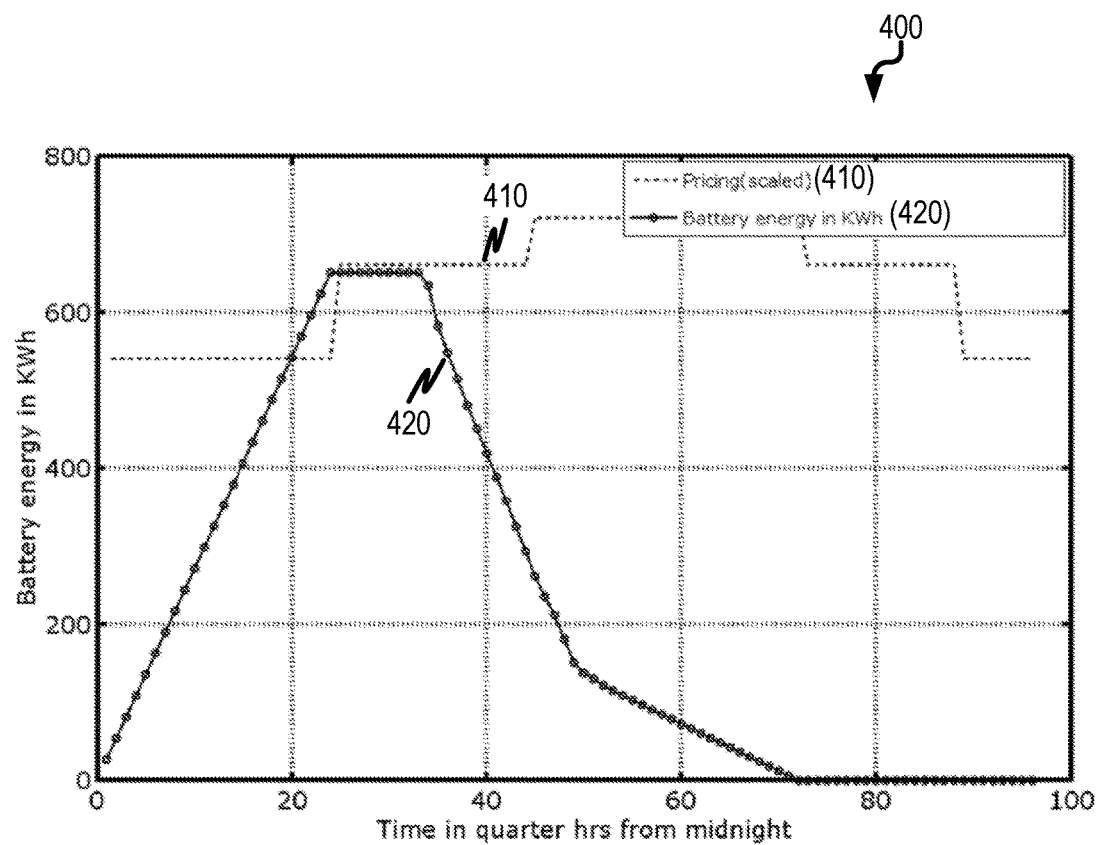
FIG. 4 is a plot illustrating the battery energy capacity and time of usage pricing corresponding to the power demand curves of FIG. 3.

FIG. 4 is a plot 400 illustrating time of usage pricing (scaled) 410 and the battery energy capacity 420 in kWh (e.g., battery SOC) and corresponding to the power demand curves of FIG. 3. As illustrated across the twenty-four hour time period, the battery SOC 420 obeys Equation (10). In this example, the maximum charge of the battery is approximately 650 kWh. For example in FIG. 4, the battery SOC 420 of FIG. 4 begins at a lower operating limit of 0 kWh (e.g., 0 kWh at 0 time in quarter hrs from 12 am). The battery SOC 420 ends back at 0 kWh (e.g., 0 kWh at 96 time in quarter hrs from 12 am). Based on the optimization discussed in connection with FIG. 3, the battery reaches a peak charge of approximately 650 kWh at interval 25 (e.g., time in quarter hrs from 12 am). During intervals 0-20, the battery is operating as a storage DER (e.g., storage DER(s) 120) and is consuming power from power grid 110 since the price of power is lower during this interval. As illustrated in FIG. 4, the battery SOC 420 is at full capacity by the end of the minimum cost of the time of usage pricing 410 curve. During interval 25 to about interval 32, the battery is dormant and neither consuming power from nor generating power to power grid 110. As the time of usage pricing increases to a level higher than when the battery was consuming power (e.g., from interval 32 to interval 96), the battery transitions to generating power to the power grid 110 (e.g., generation DER(s) 130).

In some variations, optimization can be performed over a pre-determined billing period (e.g., 30-days). Using various analysis profiles such as historical net-load data 230, weather forecast data 240, energy resources forecast data 250, and/or user input data 260, demand scheduler 210 can generate optimizations for the one or more DERs (e.g., storage DER(s) 120, generation DER(s) 130, load(s) 140) for each day. In this example, the minimum reduction in peak power demand for each day is calculated relative to the peak demand since the beginning of the billing period. The maximum of the calculated reduction (e.g., critical power demand) can be determined using Equation (1) and used as an initial peak demand on the first day of the billing period. However, if the actual peak demand of any day in this example exceeds the value of the critical power demand, then the new critical demand charge at the interval i becomes this new value. In other variations, such as when considering power consumption of a commercial building, a load profile can depend heavily on whether the interval i is on a working day or a non-working day for a given time period. In this case, the maximum power demand can be calculated based on the load profile of a working day or non-working day for a given time period.

The objective energy function, according to some variations, can be determined using a constrained least squares function. Achieving the steady-state of Equation (2) may be impractical due to physical power constraints of each DER and/or physical energy constraints of each DER. For example, individual DER power contribution levels, $P_k(t)$, can account for physical power constraints of each DER given by:

$$P_k^{min}(t) < P_k(t) < P_k^{max}(t) \tag{12}$$

and physical energy constraints of each DER given by:

$$E_k^{min} < \sum_{m=0}^{t} P_k(m) < E_k^{max} \tag{13}$$

where energy is computed as a digital integration (e.g., summation) of power contribution level, $P_k(t)$, over time, t, starting at a user chosen initial timeframe. Mismatch between the sides of Equation (1) can, in some embodiments, result in an objective energy function having a mixed real/integer optimization formula such as:

$$\min_{P_k(t)} \left\| \sum_{k \in \Omega} P_k(t) - P(t) \right\| \tag{14}$$

subjected to the constraints of Equations (12) and (13) and a non-linear constraint given by:

$$\dim(\Omega) \leq m \tag{15}$$

When choosing a particular value satisfying the following:

$$\dim(\Omega) = m, \tag{16}$$

a finite number of possible combinatory solutions, $\Omega_j$, can be determined where:

$$m \leq N \tag{17}$$

from a set of N possible DERs such that:

$$j = 1, 2, \ldots, \binom{N}{m}. \tag{18}$$

For each combinatory solution, $\Omega_j$, a solution can be determined by:

$$\min_{P_k(t)} \left\| \sum_{k \in \Omega_j} P_k(t) - P(t) \right\| \quad (19)$$

subject to the constraints for Equations (12) and (13).

Figure 5:
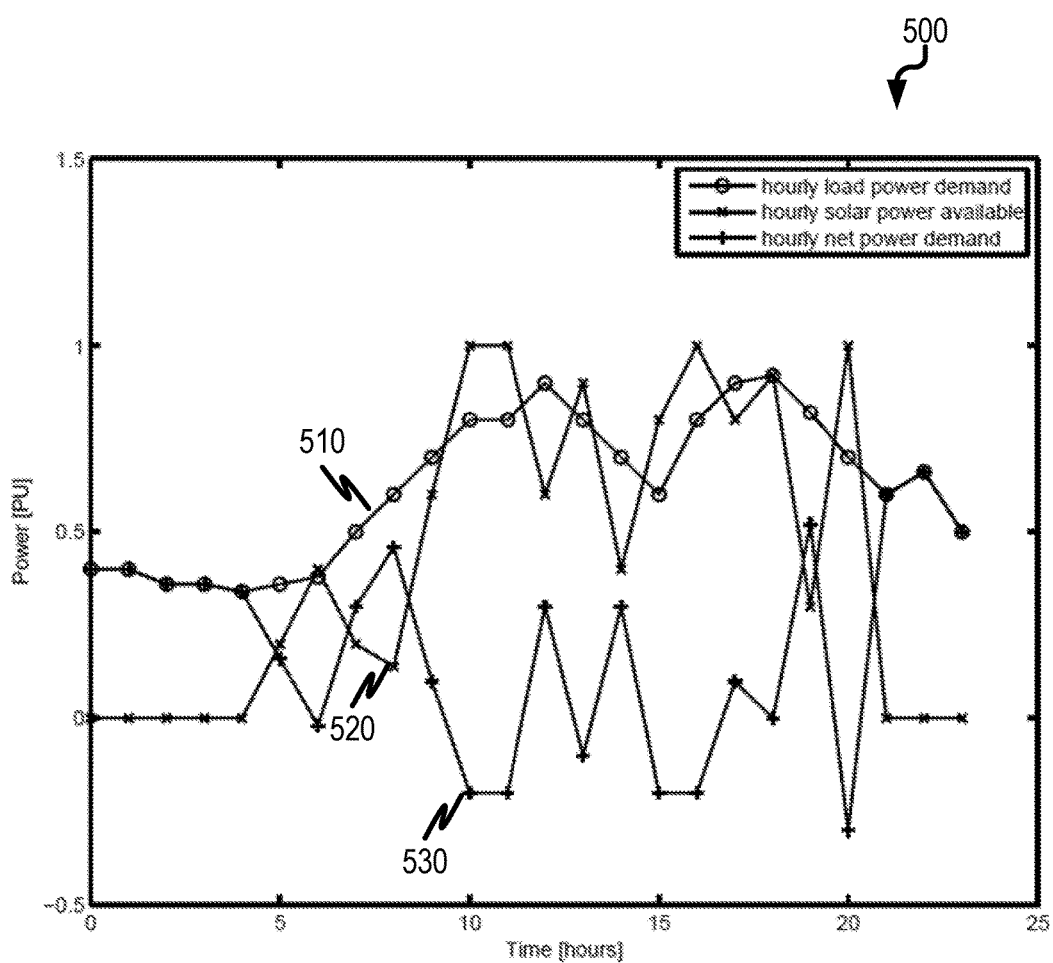
FIG. 5 is a plot illustrating example power scheduling of one or more distributed energy resources using an objective energy function derived using the combinatorial constrained least squares optimization.

FIG. 5 is a plot 500 illustrating example power scheduling of one or more DERs using an objective energy function derived using the combinatorial constrained least squares optimization. As illustrated in FIG. 5, the load power demand plot line 510 (e.g., load(s) 140) is offset by the solar power available plot line 520 (e.g., generation DER(s) 130) to result in an optimized net power demand plot line 530.

Figure 6:
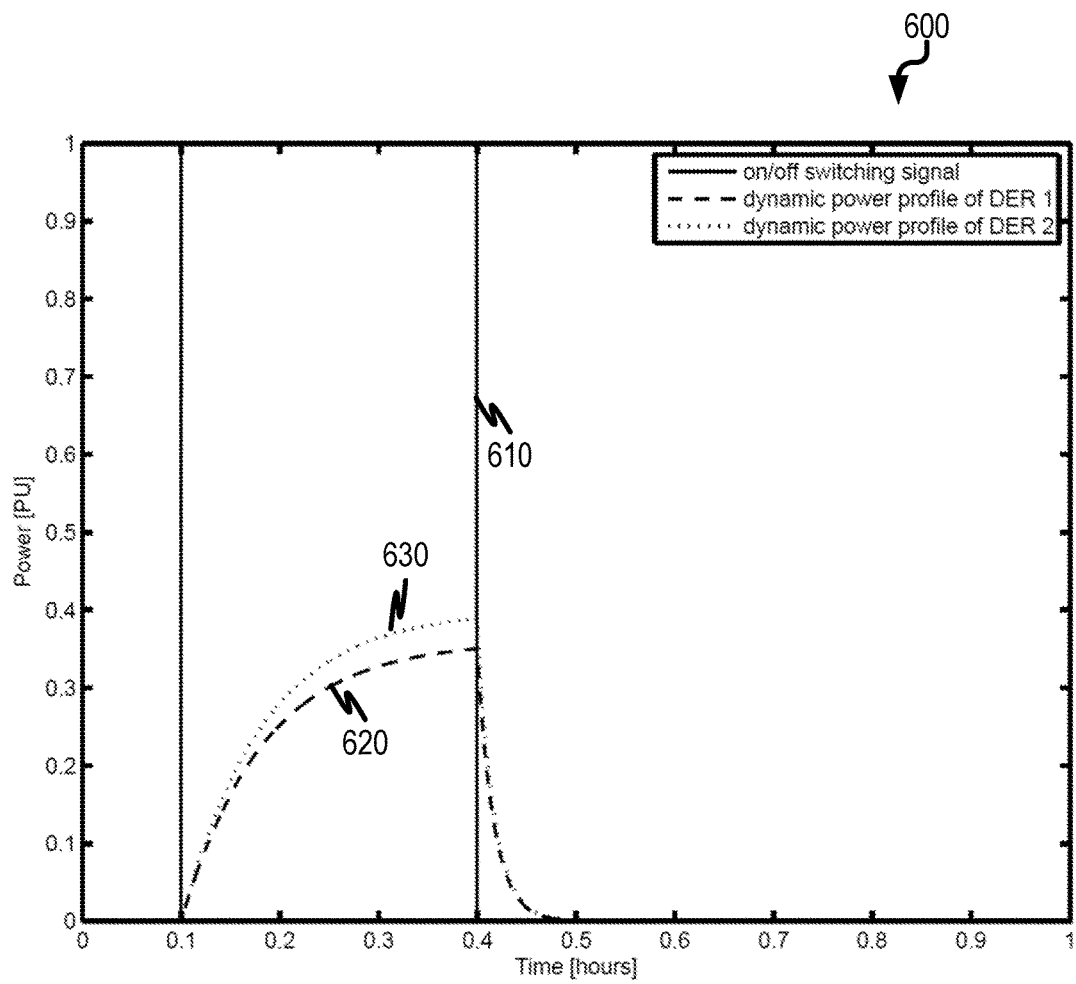
FIG. 6 is a plot illustrating example switching dynamics between two distributed energy resources.

FIG. 6 is a plot 600 depicting example switching dynamics between two DERs. In some variations, power grid 110 can include three or more DERs such as a storage DER 120 and two generation DERs 130. The switching signal plot line 610 of FIG. 6 illustrates switching of a storage DER 120. For example, while the switching signal is in an OFF state (e.g., 0), power is being provided by the storage DER 120 to the power grid and both generations DERs 130 do not generate power. While the signal is in an ON state (e.g., 1), power is being provided by the generation DERs 130 as illustrated by the increase in power of the dynamic power profile of DER 1 plot line 620 and the dynamic power profile of DER 2 plot line 630. The objective energy function derived using constrained least squares function can determine an optimal timing of switching of two or more generating DERs 130, given the presence of a battery as a storage DER 120.

Figure 7A:
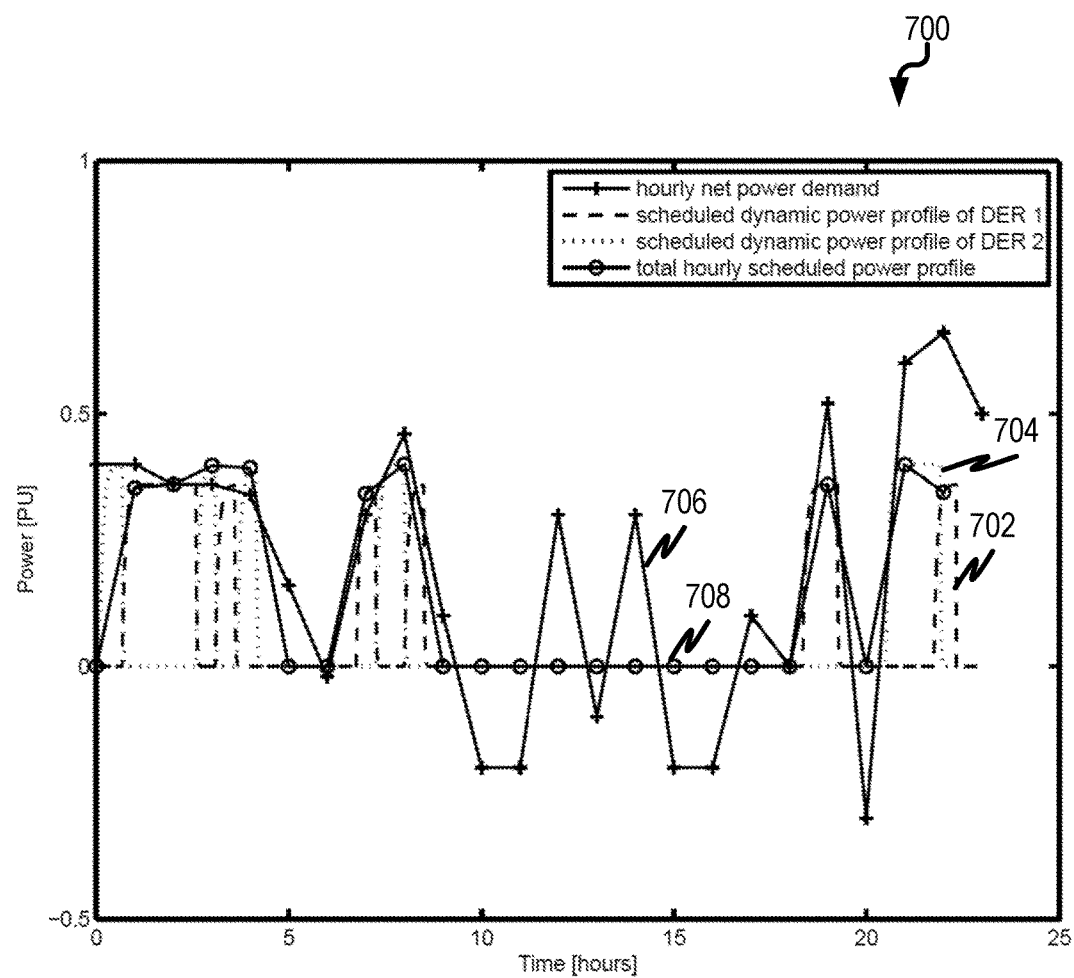
FIG. 7A is a plot illustrating total power demand of two generation distributed energy resources and a storage distributed energy resource using an objective energy function derived using a combinatorial constrained least squares function.
Figure 7B:
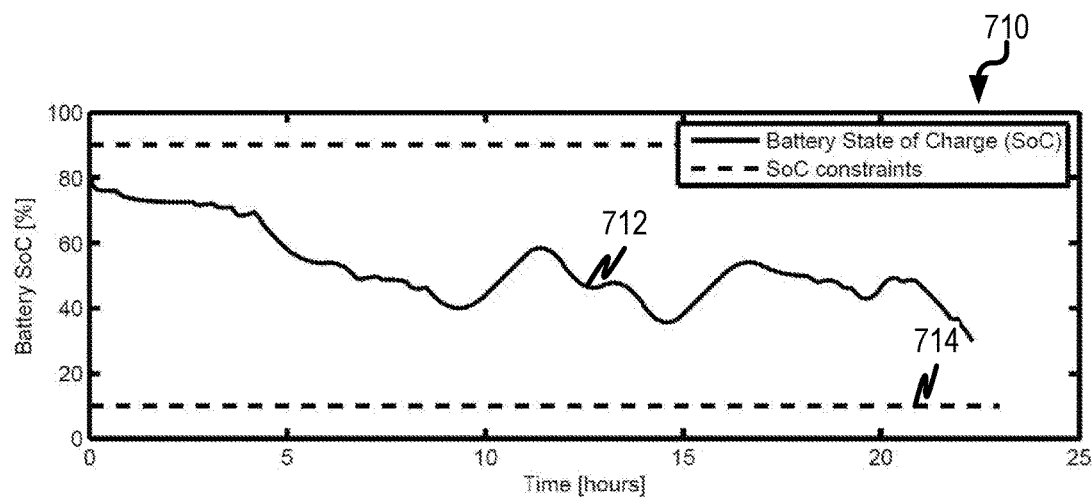
FIG. 7B is a plot illustrating the corresponding battery energy of storage DER corresponding to FIG. 7A.
Figure 7C:
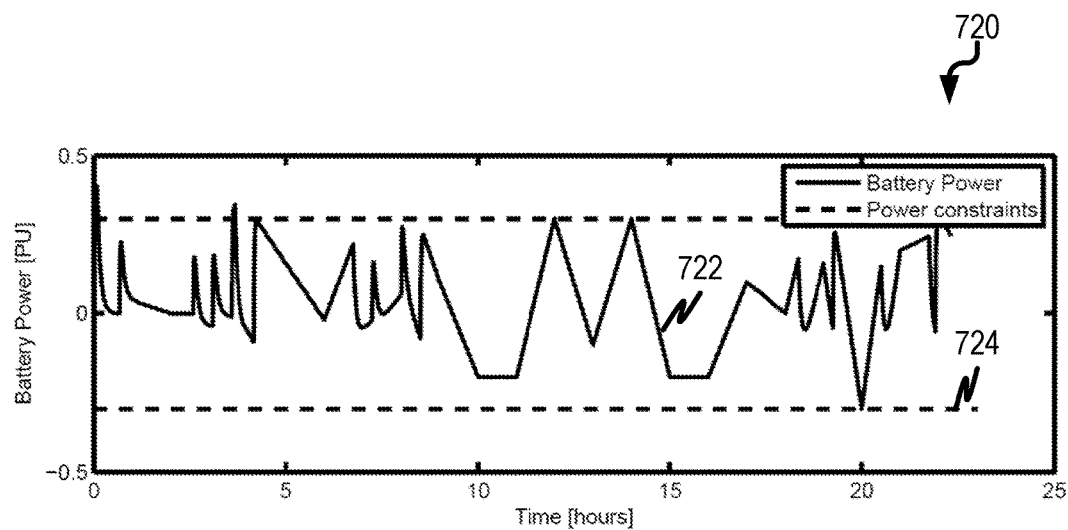
FIG. 7C is a plot illustrating the corresponding power providing by storage DER to meet the power demand illustrated in FIG. 7A.

FIG. 7A is a plot 700 illustrating total power demand of two generation DERs 130 and a storage DER 120 using an objective energy function derived using a constrained least squares function. Corresponding power of each generating DER 130 is illustrated by scheduled dynamic power profile of DER 1 702 and scheduled dynamic power profile of DER 2 704. The hourly net power demand 706 and total hourly scheduled power profile 708 produced are also illustrated in FIG. 7A. FIG. 7B is a plot 710 illustrating the corresponding battery SOC percentage 712 DER 120 corresponding to FIG. 7A, subject to SOC constraints 714. FIG. 7C is a plot 720 illustrating the corresponding battery power 722 provided by storage DER 120 to meet the power demand illustrated in FIG. 7A, subject to power constraints 724.

Figure 8:
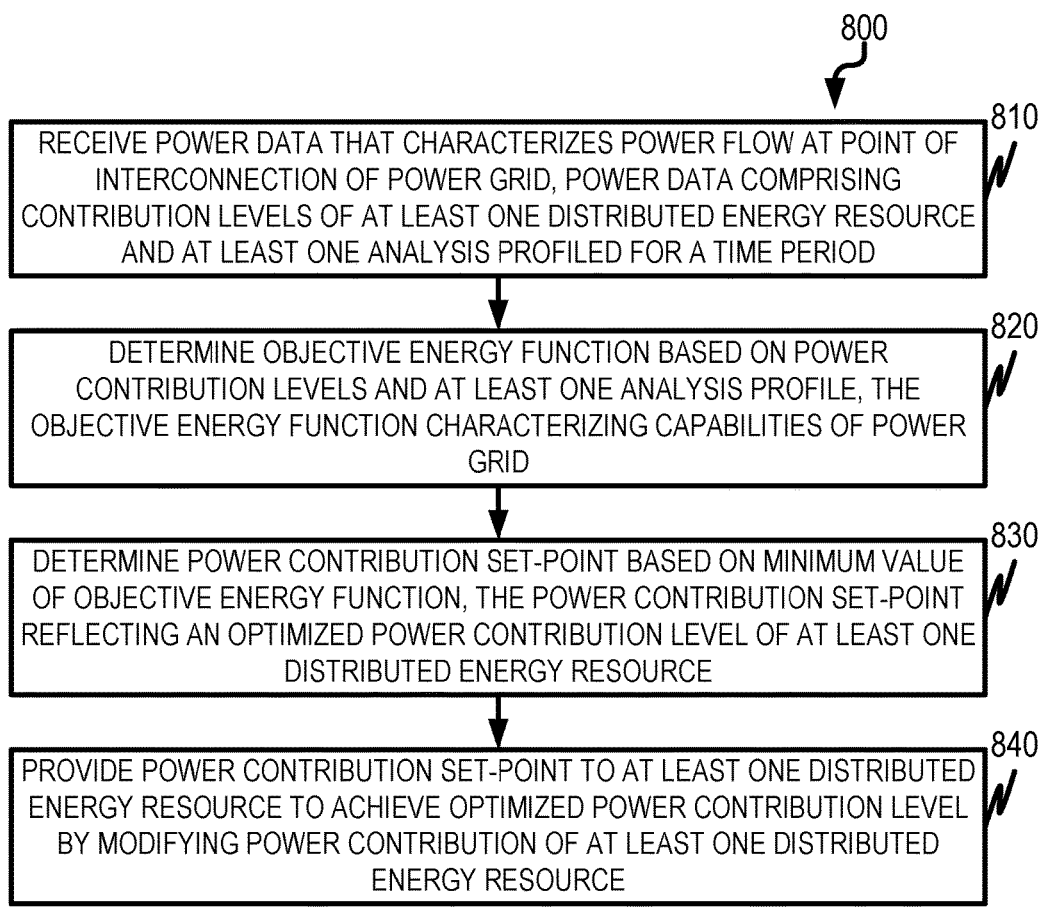
FIG. 8 is a process flow diagram illustrating controlling power at a point of interconnection of the power grid.

FIG. 8 is a process flow diagram illustrating controlling power at a point of interconnection of the power grid. Power data that characterizes power flow at a point of interconnection of the power grid is received, at 810. The power data includes power contribution levels of at least one distributed energy resource and at least one analysis profile for a time period. An objective energy function is determined, at 820, based on the power contribution levels and the at least one analysis profile. The objective energy function characterizes capabilities of the power grid. A power contribution set-point is determined, at 830, based on a minimum value of the objective energy function. The power contribution set-point reflects an optimized power contribution level of the at least one distributed energy resource. The power contribution set-point is provided, at 840, to the at least one distributed energy resource to achieve the optimized power contribution level by modifying the power contribution of the at least one distributed energy resource.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

Figure 9:
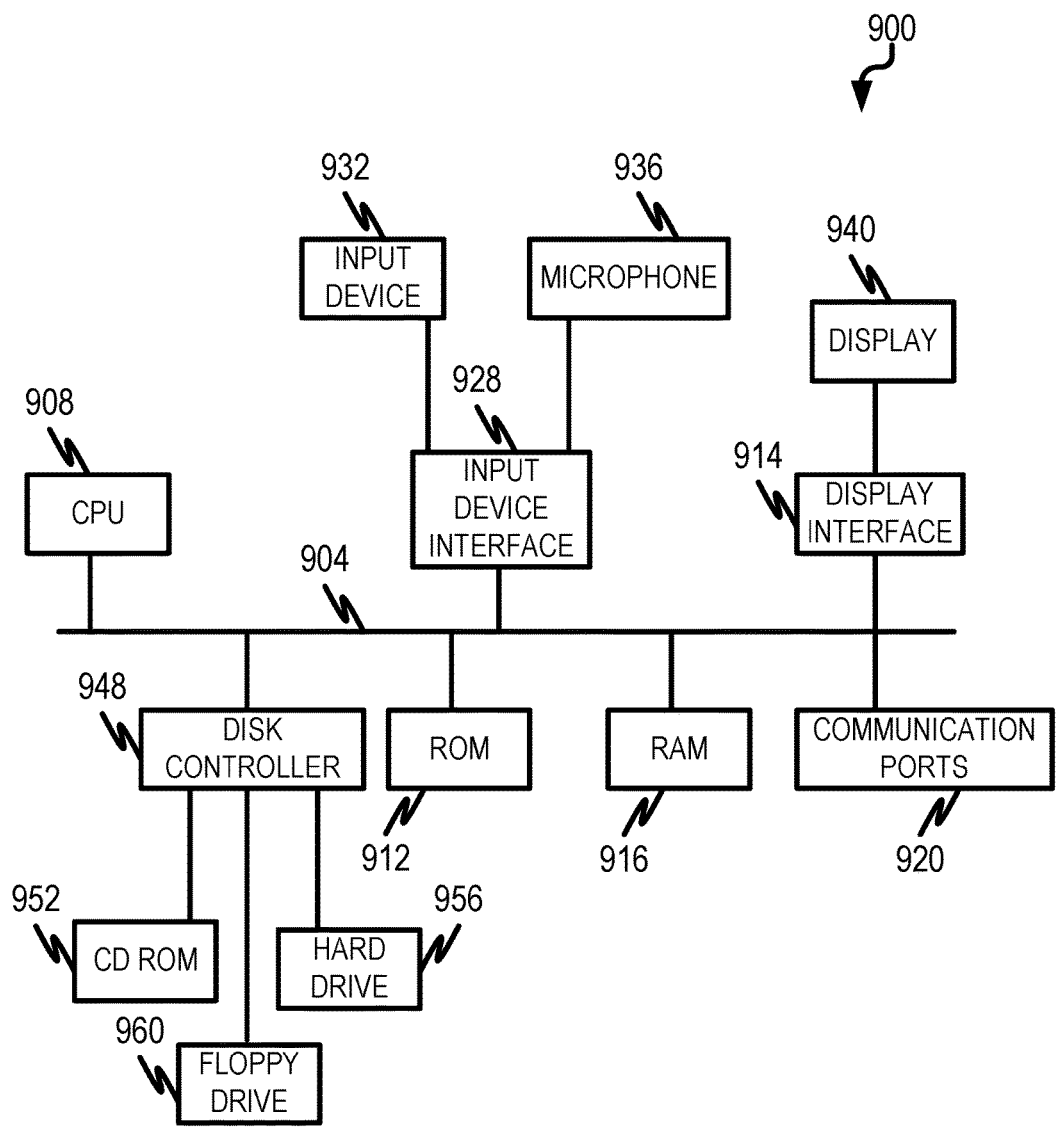
FIG. 9 is a diagram illustrating a sample computing device architecture for implementing various aspects described herein.

FIG. 9 is a diagram illustrating a sample computing device architecture 900 for implementing various aspects described herein. A system bus 904 can serve as the information highway interconnecting the other illustrated components of the hardware. A processing system 908 labeled CPU (central processing unit) (e.g., one or more computer processors/data processors at a given computer or at multiple computers), can perform calculations and logic operations required to execute a program. A non-transitory processor-readable storage medium, such as read only memory (ROM) 912 and random access memory (RAM) 916, can be in communication with the processing system 908 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 948 can interface one or more optional disk drives to the system bus 904. These disk drives can be external or internal floppy disk drives such as 960, external or internal CD-ROM, CD-R, CD-RW or DVD, or solid state drives such as 952, or external or internal hard drives 956. As indicated previously, these various disk drives 952, 956, 960 and disk controllers are optional devices. The system bus 904 can also include at least one communication port 920 to allow for communication with external devices either physically connected to the computing system or available externally through a wired or wireless network. In some cases, the communication port 920 includes or otherwise comprises a network interface.

To provide for interaction with a user, the subject matter described herein can be implemented on a computing device having a display 940 (e.g., a CRT (cathode ray tube) or LCD (liquid crystal display) monitor) for displaying information obtained from the system bus 904 to the user and an input device 932 such as keyboard and/or a pointing device (e.g., a mouse or a trackball) and/or a touchscreen by which the user can provide input to the computer. Other kinds of input devices 932 can be used to provide for interaction with a user as well; for example, feedback provided to the user can be any form of sensory feedback (e.g., visual feedback, auditory feedback by way of a microphone 936, or tactile feedback); and input from the user can be received in any form, including acoustic, speech, or tactile input. In the input device 932 and the microphone 936 can be coupled to and convey information via the system bus 904 by way of an input device interface 928. Other computing devices, such as dedicated servers, can omit one or more of the display 940 and display interface 914, the input device 932, the microphone 936, and input device interface 928.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method of controlling power at a point of interconnection of a power grid, the method being implemented by one or more data processors forming one or more computing devices and comprising:
   receiving, by at least one data processor, power data that characterizes power flow at a point of interconnection of the power grid, the power data comprising power contribution levels of at least one distributed energy resource and at least one analysis profile for a time period;
   determining, by at least one data processor, an objective energy function based on the power contribution levels and the at least one analysis profile, the objective energy function characterizing capabilities of the power grid, wherein determining the objective energy function comprises a non-linear criterion summing together (i) an energy loss scaled by energy storage states of the at least one distributed energy resource and (ii) a matrix representation of states of the at least one distributed energy resource multiplied by a penalty factor of the at least one distributed energy resource;
   determining, by at least one data processor, a power contribution set-point based on a minimum value of the objective energy function, the power contribution set-point reflecting an optimized power contribution level of the at least one distributed energy resource; and
   providing, by at least one data processor, the power contribution set-point to the at least one distributed energy resource to achieve the optimized power contribution level by modifying the power contribution of the at least one distributed energy resource.

2. The method of claim 1, wherein the penalty factor accounts for at least one operational constraint of the at least one distributed energy resource.

3. The method of claim 1, wherein determining the power contribution set-point comprises:
   receiving, by at least one data processor, an interval of the objective energy function;
   iteratively determining, by at least one data processor, a midpoint of the interval and a corresponding power contribution value of the objective energy function at the midpoint; and
   iteratively determining, by at least one data processor, convergence of the power contribution value, wherein the power contribution set-point is the lowest power contribution value having convergence.

4. The method of claim 3, wherein the interval comprises at least one of: a pre-determined interval or a variable interval having a pre-defined end-time.

5. The method of claim 1, wherein the at least one analysis profile comprises a net power demand profile of the at least one distributed resource and the objective energy function comprises a combinatorial constrained least squares function of the power contribution levels.

6. The method of claim 1, further comprising performing one or more of:
   increasing power generation of the at least one distributed energy resource based on the power contribution set-point;
   decreasing power generation of the at least one distributed energy resource based on the power contribution set-point;
   maintaining power generation of the at least one distributed energy resource based on the power contribution set-point;
   increasing energy storage of the at least one distributed energy resource based on the power contribution set-point;
   decreasing energy storage of the at least one distributed energy resource based on the power contribution set-point; or
   maintaining energy storage of the at least one distributed energy resource based on the power contribution set-point.

7. The method of claim 1, wherein the at least one distributed energy resource comprises at least one of: a photovoltaic cell, a battery, a fuel cell, a wind turbine, a combined cycle gas turbine, a sterling engine, an energy storage system, or a generator.

8. The method of claim 1, wherein the time period comprises at least one of: twenty-four hours, thirty-days, a pre-determined billing cycle, or a variable planning period.

9. The method of claim 1, wherein the at least one analysis profile comprises at least one of: historical net-load data of the power grid, forecasted weather data, or forecasted energy resource data.

10. A system for controlling power at a point of interconnection of a power grid, the system comprising:
   one or more data processors;
   memory storing instructions which when executed by at least one data processor result in operations comprising:
      receiving, by at least one data processor, power data that characterizes power flow at a point of interconnection of the power grid, the power data comprising power contribution levels of at least one distributed energy resource and at least one analysis profile for a time period;
      determining, by at least one data processor, an objective energy function based on the power contribution levels and the at least one analysis profile, the objective energy function characterizing capabilities of the power grid, wherein determining the objective energy function comprises a non-linear criterion summing together (i) an energy loss scaled by energy storage states of the at least one distributed energy resource and (ii) a matrix representation of states of the at least one distributed energy resource multiplied by a penalty factor of the at least one distributed energy resource;
      determining, by at least one data processor, a power contribution set-point based on a minimum value of the objective energy function, the power contribution set-point reflecting an optimized power contribution level of the at least one distributed energy resource; and
      providing, by at least one data processor, the power contribution set-point to the at least one distributed energy resource to achieve the optimized power contribution level by modifying the power contribution of the at least one distributed energy resource.

11. The system of claim 10, wherein the penalty factor accounts for at least one operational constraint of the at least one distributed energy resource.

12. The system of claim 10, wherein determining the power contribution set-point comprises:
   receiving, by at least one data processor, an interval of the objective energy function;
   iteratively determining, by at least one data processor, a midpoint of the interval and a corresponding power contribution value of the objective energy function at the midpoint; and
   iteratively determining, by at least one data processor, convergence of the power contribution value, wherein the power contribution set-point is the lowest power contribution value having convergence.

13. The system of claim 12, wherein the interval comprises at least one of: a pre-determined interval or a variable interval having a pre-defined end-time.

14. The system of claim 10, wherein the at least one analysis profile comprises a net power demand profile of the at least one distributed resource and the objective energy function comprises a combinatorial constrained least squares function of the power contribution levels.

15. The system of claim 10, further comprising performing one or more of:
   increasing power generation of the at least one distributed energy resource based on the power contribution set-point;
   decreasing power generation of the at least one distributed energy resource based on the power contribution set-point;
   maintaining power generation of the at least one distributed energy resource based on the power contribution set-point;
   increasing energy storage of the at least one distributed energy resource based on the power contribution set-point;
   decreasing energy storage of the at least one distributed energy resource based on the power contribution set-point; or
   maintaining energy storage of the at least one distributed energy resource based on the power contribution set-point.

16. The system of claim 10, wherein the at least one distributed energy resource comprises at least one of: a photovoltaic cell, a battery, a fuel cell, a wind turbine, a combined cycle gas turbine, a sterling engine, an energy storage system, or a generator.

17. The system of claim 10, wherein the time period comprises at least one of: twenty-four hours, thirty-days, a pre-determined billing cycle, or a variable planning period.

18. The system of claim 10, wherein the at least one analysis profile comprises at least one of: historical net-load data of the power grid, forecasted weather data, or forecasted energy resource data.

19. A non-transitory computer program product comprising a computer-readable storage medium having computer-readable program instructions, which when executed result in operations comprising:
   receiving, by at least one data processor, power data that characterizes power flow at a point of interconnection of the power grid, the power data comprising power contribution levels of at least one distributed energy resource and at least one analysis profile for a time period;
   determining, by at least one data processor, an objective energy function based on the power contribution levels and the at least one analysis profile, the objective energy function characterizing capabilities of the power grid, wherein determining the objective energy function comprises a non-linear criterion summing together (i) an energy loss scaled by energy storage states of the at least one distributed energy resource and (ii) a matrix representation of states of the at least one distributed energy resource multiplied by a penalty factor of the at least one distributed energy resource;

determining, by at least one data processor, a power contribution set-point based on a minimum value of the objective energy function, the power contribution set-point reflecting an optimized power contribution level of the at least one distributed energy resource; and providing, by at least one data processor, the power contribution set-point to the at least one distributed energy resource to achieve the optimized power contribution level by modifying the power contribution of the at least one distributed energy resource.

20. The non-transitory computer program product of claim 19, wherein the penalty factor accounts for at least one operational constraint of the at least one distributed energy resource.

21. The non-transitory computer program product of claim 19, wherein determining the power contribution set-point comprises:
  receiving, by at least one data processor, an interval of the objective energy function;
  iteratively determining, by at least one data processor, a midpoint of the interval and a corresponding power contribution value of the objective energy function at the midpoint; and
  iteratively determining, by at least one data processor, convergence of the power contribution value, wherein the power contribution set-point is the lowest power contribution value having convergence.

* * * * *